(12) United States Patent
Yanai et al.

(10) Patent No.: US 10,386,569 B2
(45) Date of Patent: Aug. 20, 2019

(54) OPTICAL MEMBER, OPTICAL ELEMENT, LIQUID CRYSTAL DISPLAY DEVICE, AND NEAR-TO-EYE OPTICAL MEMBER

(71) Applicant: FUJIFILM Corporation, Tokyo (JP)

(72) Inventors: Yujiro Yanai, Minami-ashigara (JP); Yukito Saitoh, Minami-ashigara (JP); Akira Yamamoto, Minami-ashigara (JP); Nobuhiko Ichihara, Minami-ashigara (JP); Daisuke Kashiwagi, Minami-ashigara (JP); Michio Nagai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/672,727

(22) Filed: Aug. 9, 2017

(65) Prior Publication Data

US 2017/0336555 A1 Nov. 23, 2017

Related U.S. Application Data

(63) Continuation of application No. PCT/JP2016/054000, filed on Feb. 10, 2016.

(30) Foreign Application Priority Data

Feb. 10, 2015 (JP) ................. 2015-024418

(51) Int. Cl.
*F21V 8/00* (2006.01)
*G02B 5/02* (2006.01)
(Continued)

(52) U.S. Cl.
CPC ............ *G02B 6/0055* (2013.01); *G02B 5/02* (2013.01); *G02B 5/30* (2013.01); *G02B 6/0045* (2013.01);
(Continued)

(58) Field of Classification Search
None
See application file for complete search history.

(56) References Cited

U.S. PATENT DOCUMENTS 2,367,661 A 1/1945 Agre
2,367,670 A 1/1945 Christ
(Continued)

FOREIGN PATENT DOCUMENTS

JP 57-165480 A 10/1982
JP 60-105667 A 6/1985
(Continued)

OTHER PUBLICATIONS

International Preliminary Report on Patentability and Written Opinion of the International Searching Authority (Forms PCT/IB/326, PCT/IB/373 and PCT/ISA/237) issued in International Application No. PCT/JP2016/054000 dated Aug. 24, 2017, together with an English translation.
(Continued)

*Primary Examiner* — Ryan Crockett
(74) *Attorney, Agent, or Firm* — Birch, Stewart, Kolasch & Birch, LLP

(57) ABSTRACT

Provided is an optical member having a high brightness, a low haze, and a small color change, an optical element, a liquid crystal display device, and a near-to-eye optical member. The optical member includes a plurality of cholesteric liquid crystal dots that are provided on a substrate, in which a shape of each of the dots is a hemispherical or elliptical hemispherical shape in which the substrate side is planar, a conical or elliptical conical shape in which the substrate side is set as the bottom, or a shape in which a plurality of shapes selected from the shapes are laminated, the cholesteric liquid crystal dot has a reflection center wavelength with respect to visible light, the cholesteric structure of the dot has a stripe pattern including bright
(Continued)

portions and dark portions in a cross-sectional view of the dot when observed with a scanning electron microscope, the dot includes a portion having a height which continuously increases to a maximum height in a direction moving from an end portion of the dot to the center of the dot, and in the portion, an angle between a normal line perpendicular to a line, which is formed using a first dark portion from a surface of the dot opposite to the substrate, and the surface of the dot is in a range of 70° to 90°.

13 Claims, 4 Drawing Sheets

(51) Int. Cl.
    *G02B 5/30*         (2006.01)
    *G02F 1/137*       (2006.01)
    *G02F 1/1335*      (2006.01)
    *G02F 1/13357*     (2006.01)

(52) U.S. Cl.
    CPC ...... *G02F 1/133528* (2013.01); *G02F 1/1336* (2013.01); *G02F 1/13718* (2013.01); *G02F 2203/02* (2013.01)

(56) References Cited

U.S. PATENT DOCUMENTS

| | | | |
|---|---|---|---|
| 2,448,828 | A | 9/1948 | Renfrew |
| 2,722,512 | A | 11/1955 | Crandall |
| 2,951,758 | A | 9/1960 | Notley |
| 3,046,127 | A | 1/1962 | Barney et al. |
| 3,549,367 | A | 12/1970 | Chang et al. |
| 4,212,970 | A | 7/1980 | Iwasaki |
| 4,239,850 | A | 12/1980 | Kita et al. |
| 4,410,570 | A | 10/1983 | Kreuzer et al. |
| 4,619,998 | A | 10/1986 | Buhr |
| 4,683,327 | A | 7/1987 | Stackman |
| 5,622,648 | A | 4/1997 | Parri et al. |
| 5,770,107 | A | 6/1998 | Hassall et al. |
| 5,854,211 | A | 12/1998 | Johansen et al. |
| 6,115,519 | A | 9/2000 | Espindola et al. |
| 6,136,225 | A | 10/2000 | Meyer et al. |
| 6,335,462 | B1 | 1/2002 | Etzbach et al. |
| 6,447,122 | B1* | 9/2002 | Kobayashi ............ G03B 21/006 353/97 |
| 2003/0111639 | A1 | 6/2003 | Yumoto et al. |
| 2004/0011994 | A1 | 1/2004 | Yumoto et al. |
| 2007/0085950 | A1* | 4/2007 | Hu ........................ G02B 6/0056 349/115 |
| 2007/0132915 | A1 | 6/2007 | Mi |
| 2008/0182041 | A1* | 7/2008 | Sekine ................. G02B 5/3016 428/29 |
| 2008/0252064 | A1* | 10/2008 | Sekine ................... B42D 15/00 283/91 |
| 2012/0147304 | A1 | 6/2012 | Yanai et al. |
| 2012/0242948 | A1 | 9/2012 | Taguchi et al. |
| 2013/0093968 | A1 | 4/2013 | Yanai |
| 2013/0100362 | A1 | 4/2013 | Saeedi et al. |
| 2014/0152939 | A1 | 6/2014 | Kashima |
| 2014/0204062 | A1 | 7/2014 | Goto et al. |
| 2015/0253479 | A1* | 9/2015 | Nojiri ................. G02B 5/3025 359/487.02 |
| 2016/0245968 | A1* | 8/2016 | Ichihara ................. G02B 5/26 |
| 2017/0227692 | A1* | 8/2017 | Nagai ...................... G02B 5/26 |
| 2017/0227693 | A1* | 8/2017 | Ito .......................... G06F 3/0421 |

FOREIGN PATENT DOCUMENTS

| | | | |
|---|---|---|---|
| JP | 1-272551 A | | 10/1989 |
| JP | 6-16616 A | | 1/1994 |
| JP | 6-273716 A | | 9/1994 |
| JP | 6-273716 A | * | 9/1994 |
| JP | 7-110469 A | | 4/1995 |
| JP | 8-190806 A | | 7/1996 |
| JP | 9-133810 A | | 5/1997 |
| JP | 9-506873 A | | 7/1997 |
| JP | 9-506985 A | | 7/1997 |
| JP | 10-3079 A | | 1/1998 |
| JP | 11-80081 A | | 3/1999 |
| JP | 11-293252 A | | 10/1999 |
| JP | 2000-98317 A | | 4/2000 |
| JP | 2000-180787 A | | 6/2000 |
| JP | 2001-328973 A | | 11/2001 |
| JP | 2002-80478 A | | 3/2002 |
| JP | 2002-80851 A | | 3/2002 |
| JP | 2002-129162 A | | 5/2002 |
| JP | 2002-179668 A | | 6/2002 |
| JP | 2002-179669 A | | 6/2002 |
| JP | 2002-179670 A | | 6/2002 |
| JP | 2002-179681 A | | 6/2002 |
| JP | 2002-179682 A | | 6/2002 |
| JP | 2002-338575 A | | 11/2002 |
| JP | 2002-338668 A | | 11/2002 |
| JP | 2003-313189 A | | 11/2003 |
| JP | 2003-313292 A | | 11/2003 |
| JP | 2005-99248 A | | 4/2005 |
| JP | 2007-272185 A | | 10/2007 |
| JP | 2008-180798 A | | 8/2008 |
| JP | 2009-519501 A | | 5/2009 |
| JP | 2011-99888 A | | 5/2011 |
| JP | 4825934 B1 | | 11/2011 |
| JP | 2012-18396 A | | 1/2012 |
| JP | 2012-203237 A | | 10/2012 |
| JP | 5093034 B2 | | 12/2012 |
| JP | 2014-71250 A | | 4/2014 |
| JP | 2014-109781 A | | 6/2014 |
| JP | 2014-119605 A | | 6/2014 |
| JP | 2014-143520 A | | 8/2014 |
| WO | WO 95/17692 A1 | | 6/1995 |
| WO | WO 95/22586 A1 | | 8/1995 |
| WO | WO 95/24455 A1 | | 9/1995 |
| WO | WO 97/00600 A2 | | 1/1997 |
| WO | WO 98/23580 A1 | | 6/1998 |
| WO | WO 98/52905 A1 | | 11/1998 |

OTHER PUBLICATIONS

International Search Report (Form PCT/ISA/210) issued in International Application No. PCT/JP2016/054000 dated May 10, 2016.
Japanese Office Action and English translation for corresponding Application No. 2016-574840, dated Mar. 13, 2018.
Japanese Office Action dated Jan. 8, 2019 issued in corresponding Japanese Patent Application No. 2016-574840, with English translation.

* cited by examiner

OPTICAL MEMBER, OPTICAL ELEMENT, LIQUID CRYSTAL DISPLAY DEVICE, AND NEAR-TO-EYE OPTICAL MEMBER

CROSS-REFERENCE TO RELATED APPLICATIONS

This application is a Continuation of PCT International Application No. PCT/JP2016/054000 filed on Feb. 10, 2016, which claims priority under 35 U.S.C. § 119(a) to Japanese Patent Application No. 2015-024418 filed on Feb. 10, 2015. The above application is hereby expressly incorporated by reference, in its entirety, into the present application.

BACKGROUND OF THE INVENTION

1. Field of the Invention

The present invention relates to an optical member, an optical element, a liquid crystal display device, and a near-to-eye optical member.

2. Description of the Related Art

Typically, an image display device such as a liquid crystal display device (hereinafter, also referred to as "LCD") includes at least an image display element such as a liquid crystal cell and a backlight unit.

The power consumption of a backlight unit has been reduced, and in order to improve the use efficiency of light emitted from a light source included in a backlight unit, a technique in which an optical sheet capable of contributing to the improvement of brightness (the degree of brightness per unit area) is disposed between the backlight unit and an image display element has been proposed. Such an optical sheet is called a brightness improving film and is expected as a core component of a low-power image display device because the use of mobile devices have been increased and the power consumption of home electric appliances has been reduced.

As one of the brightness improving films, an optical sheet which is generally called a prism sheet and in which an unevenness shape is formed on a light exit surface where light incident from a backlight unit exits is disclosed (for example, refer to JP1996-190806A (H8-190806A)), and is available as a commercially available product.

On the other hand, light emitted from a backlight member is absorbed by a backlight-side polarizing plate, and the transmittance is about 40% and the light use efficiency is poor. In order to solve this problem, a liquid crystal display device in which a reflective polarizing plate as another brightness improving film is used is known.

In the reflective polarizing plate, the absorbed light in a polarization direction is repeatedly reflected in a backlight unit and reused.

As a method of using this reflective polarizing plate, for example, a method of forming a dielectric multi-layer film to reflect linearly polarized light (refer to JP1997-506873A (H9-506873A) and JP1997-506985A (H9-506985A)) or a method of reflecting circularly polarized light using cholesteric liquid crystals (for example, refer to JP1998-3079A (H10-3079A)) is known.

In addition, an attempt to increase the light use efficiency has been made using a light guide plate (for example, refer to JP2000-98317A and JP2009-519501A) in which a part of non-polarized light is changed into polarized light and emitted using a difference in reflectance between S waves and P waves caused by an incidence angle.

In addition, recently, in order to realize augmented reality, for example, a transparent LCD or a transparent wearable display is proposed as a method of projecting an image or a character over a real-world environment (for example, JP2014-109781A, US2013/0100362A, and JP2014-143520A).

SUMMARY OF THE INVENTION

A prism sheet collects backlight light in a front direction so as to improve the front brightness. This light collection accompanies energy loss caused by reflection or diffusion in a backlight unit. Therefore, the cumulative value of light amount in all the directions (also called total luminous flux) decreases, and the light use efficiency decreases.

A reflective polarizing plate uses depolarization caused by reflection or diffusion in a backlight unit and thus performs polarization accompanying energy loss. Therefore, currently, light emitted from a backlight unit cannot be sufficiently reused although the amount of light absorbed by a backlight-side polarizing plate is reduced and the light use efficiency is improved.

A light guide plate which emits polarized light is highly dependent on the angles of reflectance of S waves and P waves and thus is highly dependent on the angle of a polarization degree.

However, in a transparent LCD, the above-described backlight unit which is not transparent cannot be used, and external light is used in many cases. In addition, there is room for the improvement of visibility.

On the other hand, JP2014-109781A proposes a technique in which cholesteric liquid crystals in a liquid crystal portion of a liquid crystal panel are used without using a backlight unit. However, it is necessary that optical rotations of pixels and a light source match with each other, and a deviation occurs in oblique observation. Therefore, it is expected that a direction range in which the panel is seen transparent would be narrow.

In addition, in a wearable display, a fine protrusion (US2013/0100362A) or holography (JP2014-143520A) is used in order for an image or a video to be guided by total reflection and to be incident on eyes. In the former case, light is reflected due to a difference in refractive index, and thus the clarity of an environment is poor. In addition, in the latter case, the light directivity changes to a specific angle, and thus the clarity is maintained. However, it is thought that a wearable display using holography is used at only a specific wavelength due to its high wavelength dependence.

The present invention has been made in consideration of the above-described circumstances, and an object thereof is to provide an optical member and an optical element in which the total luminous flux can be improved and in which the transparency is high. Further, another object of the present invention is to provide an image display device or a near-to-eye optical member including the optical member or the optical element.

[1] An optical member comprising:
a plurality of cholesteric liquid crystal dot that are provided on a substrate,
in which a shape of each of the dots is a hemispherical or elliptical hemispherical shape in which the substrate side is planar, a conical or elliptical conical shape in which the substrate side is set as the bottom, a shape in which the top of one of the shapes is cut and flattened to be substantially parallel to the substrate, or a shape in which a plurality of shapes selected from the shapes are laminated, and the cholesteric liquid crystal dot has a reflection center wavelength with respect to visible light (having a wavelength defined in this specification), the cholesteric structure of the dot has a stripe pattern including bright portions and dark portions in a cross-sectional view of the dot when observed with a scanning electron microscope, the dot includes a portion having a height which continuously increases to a maximum height in a direction moving from an end portion of the dot to the center of the dot, and in the portion, an angle between a normal line perpendicular to a line, which is formed using a first dark portion from a surface of the dot opposite to the substrate, and the surface of the dot is in a range of 70° to 90°.

[2] The optical member according to [1], in which the plurality of cholesteric liquid crystal dot include at least one selective reflection center wavelength range selected from a range of 420 to 480 nm, a range of 520 to 580 nm, a range of 600 to 660 nm, and a range of 700 to 760 nm.

[3] The optical member according to [2], in which an overcoat layer in contact with the plurality of cholesteric liquid crystal dot is provided.

[4] An optical element comprising:

the optical member according to any one of [1] to [3]; and a light source, in which a substrate is a light guide member.

[5] An optical element comprising:

the optical member according to any one of [1] to [3]; and a light source, in which a light guide member in direct contact with the optical member is provided in addition to a substrate.

[6] A liquid crystal display device comprising:

the optical element according to [4] or [5];

a liquid crystal cell; and a polarizing plate.

[7] A near-to-eye optical member comprising at least:

the optical member according to any one of [1] to [3]; and an image display portion.

The optical member according to the present invention includes a plurality of cholesteric liquid crystal dots that are provided on a substrate. In this optical member, the total luminous flux can be improved, and the transparency is high. The optical element according to the present invention includes: an optical member including a plurality of cholesteric liquid crystal dots that are provided on a substrate; and a light source. In this optical element, the total luminous flux can be improved, and the transparency is high.

DESCRIPTION OF THE PREFERRED EMBODIMENTS

Hereinafter, an optical member, an optical element, a liquid crystal display device, and a near-to-eye optical member according to the present invention will be described in detail based on a preferable embodiment shown in the accompanying drawings.

In this specification, numerical ranges represented by "to" include numerical values before and after "to" as lower limit values and upper limit values.

In this specification, for example, unless specified otherwise, an angle such as "45°", "perpendicular", or "orthogonal" represents that a difference from an exact angle is less than 5 degrees. The difference from an exact angle is preferably less than 4 degrees and more preferably less than 3 degrees.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

The optical member according to the present invention includes a plurality of cholesteric liquid crystal dots that are provided on a substrate, in which a shape of each of the dots is a hemispherical or elliptical hemispherical shape in which the substrate side is planar, a conical or elliptical conical shape in which the substrate side is set as the bottom, a shape in which the top of one of the shapes is cut and flattened to be parallel to the substrate, or a shape in which a plurality of shapes selected from the shapes are laminated, and the cholesteric liquid crystal dot has a reflection center wavelength with respect to visible light.

[Optical Member]

Figure 1:
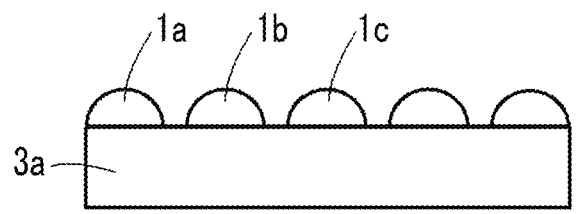
FIG. 1 is a cross-sectional view schematically showing an optical member according to an embodiment of the present invention.

As shown in FIG. 1, the optical member according to the present invention includes a plurality of cholesteric liquid crystal dots 1a, 1b, and 1c (hereinafter, also referred to as "dot") that are provided on a substrate 3a. In the following description, the dots 1a, 1b, and 1c will be collectively referred to as the dot 1 unless it is unnecessary to distinguish them from each other.

Figure 2:
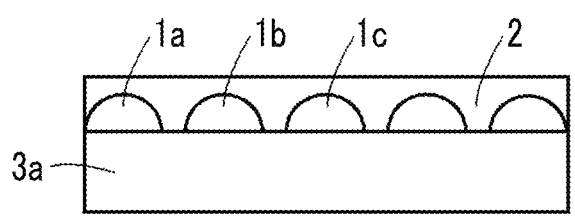
FIG. 2 is a cross-sectional view schematically showing an optical member according to an embodiment of the present invention in which an overcoat layer is provided.

In addition, as shown in FIG. 2, an overcoat layer 2 that covers the dot 1 may be provided.

[Optical Element]

The optical element according to the present invention is a combination of the above-described optical member and a light source. At this time, light emitted from the light source may pass through the substrate of the optical member or through a light guide member other than the substrate.

Figure 4:
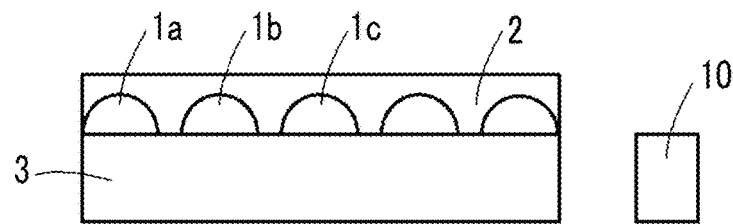
FIG. 4 is a cross-sectional view schematically showing an optical element according to an embodiment of the present invention.

For example, in an optical element shown in FIG. 4, a light guide member 3 is used as a substrate, and an optical member including the plurality of dots 1 that are provided on the light guide member 3 is combined with a light source 10. In the example shown in the drawing, the light source 10 is disposed to face a side surface of the light guide member 3.

Figure 5:
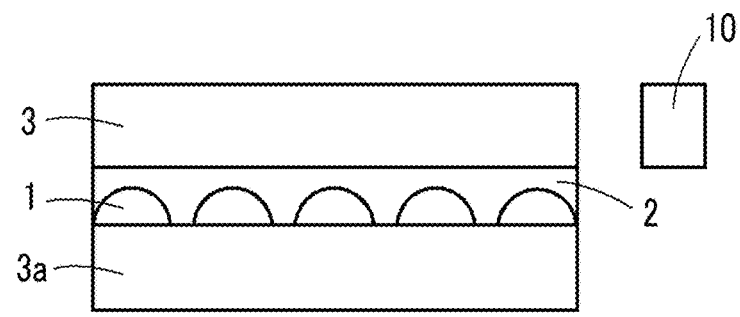
FIG. 5 is a cross-sectional view schematically showing an optical element according to an embodiment of the present invention in which a substrate and a light guide member are different from each other.

Alternatively, an optical element shown in FIG. 5 has a configuration in which the light guide member 3 is laminated on the overcoat layer 2 side of the optical member shown in FIG. 2 such that the light source 10 is disposed to face a side surface of the light guide member 3.

Figure 3:
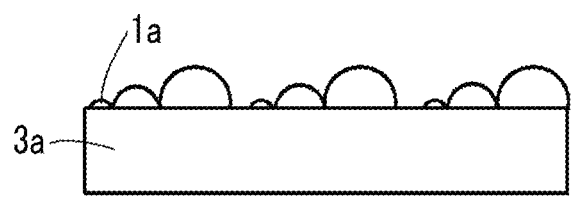
FIG. 3 is a cross-sectional view schematically showing an optical member according to an embodiment of the present invention in which cholesteric liquid crystal dots have different sizes.
Figure 6:
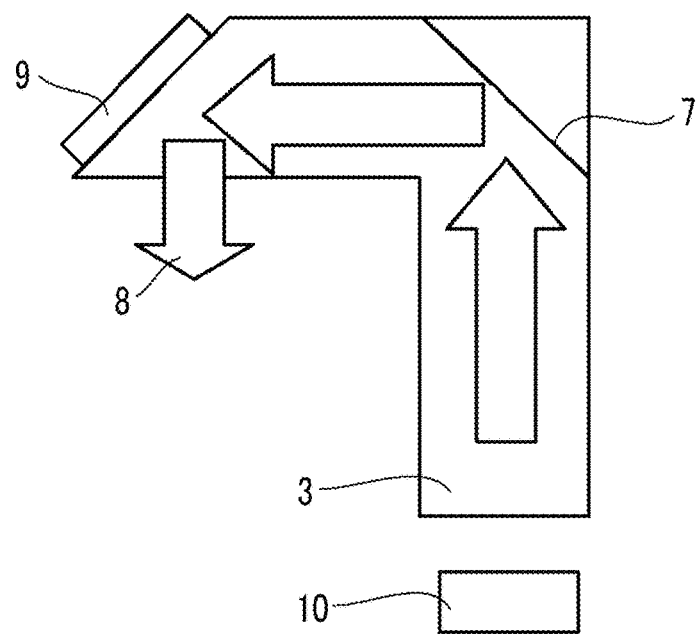
FIG. 6 is a cross-sectional view schematically showing an optical element according to an embodiment of the present invention.

In addition, the optical element according to the present invention can be used as a near-to-eye optical element shown in FIG. 6. The near-to-eye optical element shown in FIG. 6 includes: the light guide member 3 having a substantially L-shape; a half mirror 7 that is disposed at a corner portion of the L shape of the light guide member 3 and reflects light such that the light passes through the inside of the light guide member 3; the light source 10 that is disposed to face one distal end portion of the light guide member 3; and an optical element 9 that is disposed at the other distal end portion of the light guide member 3. The optical element 9 is as shown in FIG. 2 or 3 and is disposed at a position where a line of sight and an image overlap each other.

[Substrate]

The substrate included in the optical member according to the present invention is not particularly limited as long as a dot can be formed on a surface thereof.

It is preferable that the reflectance of the substrate is low at a wavelength where the dot reflects light, and it is preferable that the substrate does not include a material which reflects light at a wavelength where the dot reflects light.

In addition, it is preferable that the substrate is transparent in the visible range in order to maintain the visibility of an image displayed on a transparent display when used on a visible side of the display. "Transparent" described in this specification represents that the non-polarized light transmittance (total transmittance) at a wavelength of 380 to 780 nm is preferably 50% or higher, more preferably 70% or higher, and still more preferably 85% or higher.

In addition, the substrate may be colored. However, it is preferable that the substrate is not colored or the area of the substrate colored is small. Further, the refractive index of the substrate is preferably about 1.2 to 2.0 and more preferably about 1.4 to 1.8. The thickness of the substrate may be selected depending on the application without any particular limitation, and is preferably about 5 μm to 1000 μm, more preferably 10 μm to 250 μm, and still more preferably 15 μm to 150 μm.

The substrate may be configured as a single layer or a laminate including two layers, and examples thereof include glass, triacetyl cellulose (TAC), acyl, polycarbonate, polyvinyl chloride, polyolefin, polyethylene terephthalate (PET). Among these, glass, triacetyl cellulose (TAC), acryl, or the like having low birefringence is preferable from the viewpoint of preventing circularly polarized light, which is obtained by reflection from the dot, from changing. The birefringence can be expressed by Re/Rth described below.

In this specification, Re ($\lambda$) and Rth ($\lambda$) represent an in-plane retardation and a thickness-direction retardation at a wavelength of $\lambda$, respectively. The units are nm. Re($\lambda$) is measured using KOBRA 21ADH or WR (manufactured by Oji Scientific Instruments Co., Ltd.) by causing light at a wavelength of $\lambda$ nm to be incident in a film normal direction. The measurement wavelength $\lambda$ nm can be selected by manually changing a wavelength selective filter or changing a measured value using a program or the like. In a case where a film to be measured is expressed by a uniaxial or biaxial index ellipsoid, Rth ($\lambda$) is calculated using the following method.

Re ($\lambda$) is measured at 6 points in total by causing light having a wavelength of $\lambda$ nm to be incident from directions unilaterally tilted up to 50° at steps of 10° from a film normal direction with an in-plane retardation axis (determined using KOBRA 21ADH or WR) set as the tilt axis (rotation axis) (in a case where a retardation axis is not present, an arbitrary direction in a film plane is set as the rotation axis). Rth ($\lambda$) is calculated using, KOBRA 21ADH or WR based on the measured retardation values, an assumed value of average refractive index, and an input film thickness value. In the above description, in a case where a film has a direction in which a retardation value is zero at a given tilt angle from the normal direction with an in-plane retardation axis set as the rotation axis, a retardation value at a tilt angle greater than the tilt angle is calculated using KOBRA 21ADH or WR after changing the sign of the retardation value to minus. Rth can also be calculated from the following Expressions (A) and (B) based on measured retardation values, an assumed value of average refractive index, and an input film thickness value, the retardation values being measured from two arbitrary directions tilted from the normal direction with a retardation axis (determined using KOBRA 21ADH or WR) set as the tilt axis (rotation axis) (in a case where a retardation axis is not present, an arbitrary direction in a film plane is set as the rotation axis).

$$Re(\theta) = \left[ nx - \frac{(ny \times nz)}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left(\sin^{-1}\left(\frac{\sin(\theta)}{nx}\right)\right)}$$

Expression (A)

Re ($\theta$) shown above represents a retardation value in a direction tilted at an angle of $\theta$ from the normal direction. In addition, in Expression (A), nx represents a refractive index in an in-plane retardation axis direction, ny represents a refractive index in an in-plane direction perpendicular to nx, and nz represents a refractive index in a direction perpendicular to nx and ny. d represents the thickness.

$$Rth = ((nx + ny)/2 - nz) \times d$$

Expression (B)

In a case where a film to be measured is not expressed by a uniaxial or biaxial index ellipsoid, that is, has no optic axis, Rth ($\lambda$) is calculated using the following method. Re ($\lambda$) is measured at 11 points by causing light having a wavelength of $\lambda$ nm to be incident from directions tilted in an angle range of −50° to 50° at steps of 10° from a film normal direction with an in-plane retardation axis (determined using KOBRA 21ADH or WR) set as the tilt axis (rotation axis). Rth ($\lambda$) is calculated using KOBRA 21ADH or WR based on the measured retardation values, an assumed value of average refractive index, and an input film thickness value. In addition, in the above-description, as the assumed value of average refractive index, values described in "Polymer Handbook" (John Wiley&Sons, Inc.) and catalogs of various optical films can be used. In a case where a value of average refractive index is not known, the value can be measured using an Abbe refractometer. The values of average refractive index of major optical films are as follows: cellulose acylate (1.48), cycloolefin polymer (1.52), polycarbonate (1.59), polymethyl methacrylate (1.49), and polystyrene (1.59). By inputting the assumed value of average refractive index and the film thickness, KOBRA 21ADH or WR can calculate nx, ny, and nz. Based on the calculated values of nx, ny, and nz, "Nz=(nx−nz)/(nx−ny)" is further calculated.

In order to suppress a polarization change, Re (550)/Rth (550) of the substrate is preferably 0 to 20 nm/−80 to 80 nm, more preferably 0 to 15 nm/−65 to 65 nm, and still more preferably 0 to 10 nm/−50 to 50 nm.

In the present invention, in a case where a combination of the optical member and the light source is used as an optical element, incident light emitted from the light source to the substrate passes through the inside of the substrate and is emitted to the dot. In this case, the substrate functions as a light guide member.

[Cholesteric Liquid Crystal Dot]

In the present invention, the cholesteric liquid crystal dot is obtained by forming a dot shape on the substrate or the like using a method such as coating or jetting from a composition, which contains a liquid crystal compound having an ability to form a cholesteric structure, and performing drying, orientation aligning, and ultraviolet curing on the formed dot. The dot shape will be described below.

It is preferable that the cholesteric liquid crystal dot (hereinafter, also referred to as "dot") is Grandjean-oriented along an interface between the dot and air. Light where the dot exhibits selective reflecting properties is visible light. In the present invention, visible light refers to light having a wavelength of 400 nm to 800 nm. In the present invention, a plurality of dots are formed. In this case, the dots may include only one kind of dots that reflect light in the same wavelength range, or may include two or more kinds of dots that reflect light in different wavelength ranges.

In addition, regarding the center wavelength of light where the dot exhibits selective reflecting properties, from the viewpoint of realizing full color display, it is preferable that three kinds of dots having reflection wavelength ranges of red (600 to 800 nm), green (500 to 600 nm), and blue (400 to 500 nm) are preferable, and it is more preferable that the dots have at least one reflection wavelength range selected from a range of 420 to 480 nm, a range of 520 to 580 nm, a range of 600 to 660 nm, and a range of 700 to 760 nm. The reflection wavelength range can be adjusted by adjusting a helical pitch in the cholesteric structure of the liquid crystal compound which forms the dot as described above.

In addition, a full width at half maximum Δλ (nm) of a reflection wavelength range (circularly polarized light reflection bandwidth) where selective reflection is exhibited depends on a birefringence Δn of the liquid crystal compound and the pitch P and complies with a relationship of Δλ=Δn×P. Therefore, the full width at half maximum of the reflection wavelength range can be controlled by adjusting Δn. Δn can be adjusted by adjusting the kind of the polymerizable liquid crystal compound and a mixing ratio thereof, or by controlling a temperature during oriented immobilization. The full width at half maximum of the reflection wavelength range is adjusted depending on the use of the optical member according to the present invention. For example, in order to improve transparency, it is preferable that the reflection wavelength range is narrow. In a case where it is desired that the reflection wavelength range is scattered over the wavelength range of visible light, it is preferable that the reflection wavelength range is wide. The full width at half maximum of the reflection wavelength range may be 25 to 200 nm and is preferably 50 to 100 nm.

(Shape of Dot)

Examples of the dot shape include a hemispherical or elliptical hemispherical shape in which the substrate side is planar and a conical or elliptical conical shape in which the substrate side is set as the bottom.

In addition, examples of the dot shape also include a shape in which the top of one of the shapes is cut and flattened to be substantially parallel to the substrate.

In a case where the dot shape is a conical shape, this conical shape is triangular when observed from a cross-sectional direction. This triangular shape may be symmetrical or asymmetrical. When it is desired to significantly change the directivity of incident light, it is preferable that the triangular shape is asymmetrical.

In addition, a shape in which the above-described dots are laminated may be adopted. For example, by laminating cholesteric layers having different reflection wavelength ranges on the same position, a dot which has high density and can reflect blue light, green light, and red light can be formed.

In addition, by laminating the dots 1 having different heights to be shifted as shown in FIG. 3, the envelope thereof has an asymmetrical triangular shape when observed from a cross-sectional direction, and a dot which can significantly change the directivity can be formed.

Regarding the diameter of the dot, the length of a portion of the dot in contact with the substrate is preferably 10 to 300 μm and more preferably 20 to 2000 μm.

The dot includes a portion having a height which continuously increases to a maximum height in a direction moving from an end portion of the dot to the center of the dot. That is, the dot includes an inclined portion, a curved portion, or the like whose height increases from an end portion of the dot to the center of the dot. In this specification, the above portion will also be referred to as the inclined portion or the curved portion. The inclined portion or the curved portion refers to a portion of a dot surface in a cross-sectional view, the portion being surrounded by a portion of the dot surface which ranges from a continuous increasing start point to a maximum height point, a straight line which connects the points to the substrate at the shortest distance, and the substrate.

The inclined portion or the curved portion may be present at end portions in some or all the directions when seen from the center of the dot. For example, in a case where the dot is circular, end portions correspond to the circumference, and the inclined portion or the curved portion may be present at end portions in some directions of the circumference (for example, portions corresponding to a length of 30% or more, 50% or more, or 70% or more and 90% or less of the circumference), or may be present at end portions in all the directions of the circumference (90% or more, 95% or more, or 99% or more of the circumference). It is preferable that the end portions of the dot may be present in all the directions of the circumference. That is, it is preferable that changes in height from the center of the dot to the circumference are the same in all the directions of the circumference. In addition, it is preferable that optical characteristics such as retroreflection properties and properties described regarding the cross-sectional view are the same in all the directions moving from the center to the circumference.

The inclined portion or the curved portion may be at a predetermined distance from an end portion of the dot (an edge or a boundary of the circumference) so as not to reach the center of the dot, or may reach the center of the dot from an end portion of the dot. In addition, the inclined portion or the curved portion may be at a predetermined distance from a portion, which is at a predetermined distance from an edge (boundary) of the circumference of the dot, so as not to reach the center of the dot, or may reach the center of the dot from a portion which is at a predetermined distance from an end portion of the circumference of the dot.

The height of the dot is preferably 10 to 150 μm and more preferably 20 to 100 μm.

"The height" of the dot described in this specification refers to "the shortest distance from a point of a surface of the dot opposite to the substrate to a surface of the substrate where the dot is formed". At this time, the surface of the dot opposite to the substrate may be an interface with another layer. In addition, in a case where the substrate has convex and concave portions, a surface of an end portion of the dot extending from the substrate is set as the surface where the dot is formed. The maximum height refers to a maximum value of the height which is, for example, the shortest distance from the peak of the dot to the surface of the substrate where the dot is formed.

A point of the dot surface for obtaining the maximum height of the dot may be present at the peak of a hemispherical shape or a conical shape or may be present on a surface which is cut and smoothened to be substantially parallel to the substrate. It is preferable that the maximum height of the dot is obtained at all the points of the smooth surface. It is also preferable that the maximum height is obtained at the center of the dot.

In addition, an angle (for example, an average value) between a surface of the dot opposite to the substrate and the substrate (surface of the substrate where the dot is formed) is not particularly limited and is preferably 10° to 70° and more preferably 20° to 60°.

(Density of Dot)

In the present invention, a plurality of dots are provided on the substrate. Two or more dots may be provided to be adjacent to each other on the surface of the substrate such that the total surface area of the dots is 50% or more, 60% or more, or 70% or more with respect to the area of the surface of the substrate where the dots are formed. It is preferable that the proportion of the total surface area increases because the brightness increases. However, from the viewpoint of forming dots to be adjacent to each other, the proportion of the total surface area is preferably 98% or less. For example, in this case, the optical characteristics of the dots such as selective reflecting properties may match with the optical characteristics of substantially the entire area of the optical member, in particular, the entire area of the surface where the dots are formed. On the other hand, two or more dots may be provided to be distant from each other on the surface of the substrate such that the total surface area of the dots is less than 50%, 30% or less, or 10% or less with respect to the area of the surface of the substrate where the dots are formed. In this case, the optical characteristics of the surface of the optical member where the dots are formed may be recognized as a contrast between the optical characteristics of the substrate and the optical characteristics of the dots.

A plurality of dots may be formed in a pattern shape or randomly.

In a case where a plurality of dots having a diameter of 20 to 200 μm are formed, 10 to 1000 dots, preferably 30 to 800 dots, and more preferably 50 to 600 dots are provided on average in a square having a size of 2 mm×2 mm on the substrate surface. At this time, it is also preferable that dots having different reflection wavelength ranges in visible light are disposed to be adjacent to each other. A group of dots having different reflection wavelength ranges will be referred to as "dot group". The dot group can be expressed by a circle including the respective dots, the diameter of the circle is not particularly limited as long as the circle includes the dots having different reflection wavelength ranges. The diameter of the dot group is preferably 40 μm to 100 μm.

Figure 7:
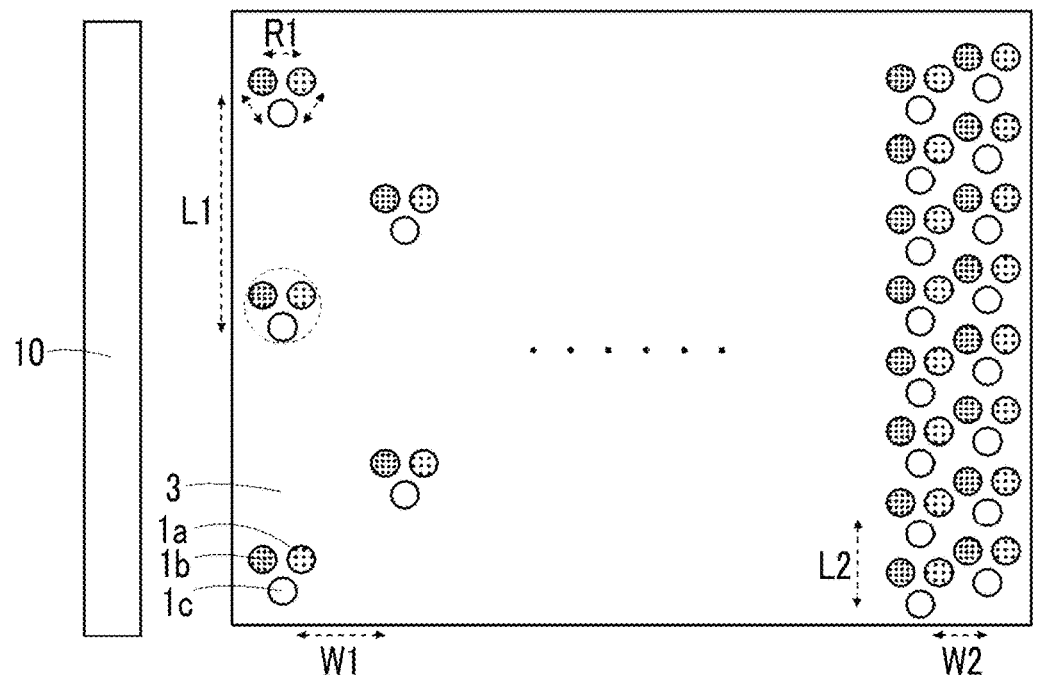
FIG. 7 is a plan view showing an optical element according to an embodiment of the present invention in which, as the distance from a light source increases, the distance between dot groups decreases.
Figure 8:
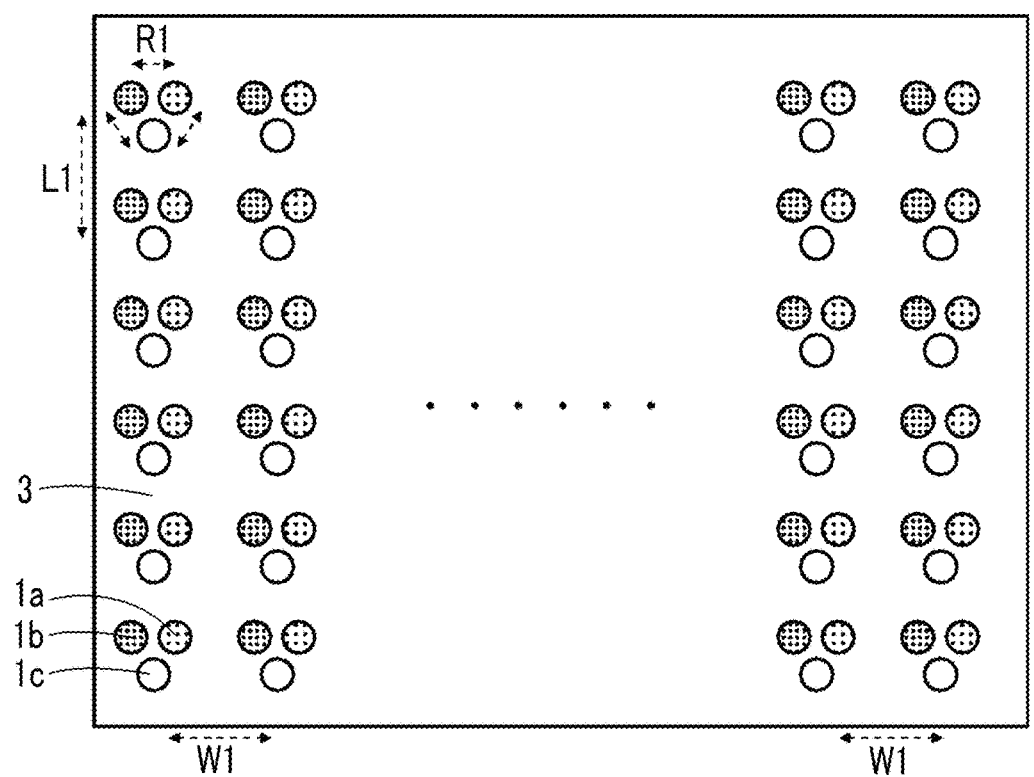
FIG. 8 is a plan view showing an optical member according to an embodiment of the present invention in which the distance between dot groups is constant.

In addition, a density distribution may be present in the surface. For example, the number of dots in one end portion may be 100 on average, and the number of dots in the other end portion may be 500 on average In a region between the end portions, the number of dots may change continuously or stepwise. That is, in FIG. 7, in an end portion close to the light source, a distance L1 between the dot groups is wide. As the distance from the light source increases, the distance between the dot groups gradually decreases. In an end portion distant from the light source, the distance between the dot groups is L2. As shown in FIG. 8, the distances between the dot groups may be the same.

In a case where a plurality of dots are provided on a surface of the substrate, the diameters, shapes, and reflection wavelength ranges of the dots may be the same as or different from each other.

The dot shape, the diameter, the length, the angle, the number of dots, and the distance between dots can be obtained from an image obtained using a laser microscope, a scanning electron microscope (SEM), a transmission electron microscope (TEM), an optical microscope, or the like.

(Cholesteric Structure)

It is known that the cholesteric structure exhibits selective reflecting properties at a specific wavelength. A center wavelength of the selective reflection depends on a pitch P (=helical cycle) of a helical structure in the cholesteric structure and complies with an average refractive index n of a cholesteric liquid crystal and a relationship of $\lambda=n\times P$. Therefore, the selective reflection wavelength can be adjusted by adjusting the pitch of the helical structure. The pitch of the cholesteric structure depends on the kind of a chiral agent which is used in combination of a polymerizable liquid crystal compound during the formation of the dot, or the concentration of the chiral agent added. Therefore, a desired pitch can be obtained by adjusting the kind and concentration of the chiral agent. The details of the preparation of the pitch can be found in "Fuji Film Research&Development" No. 50 (2005), pp. 60 to 63. As a method of measuring a helical sense or pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric structure has a stripe pattern including bright portions and dark portions in a cross-sectional view of the dot when observed with a scanning electron microscope (SEM). Two cycles of the bright portion and the dark portion (two bright portions and two dark portions) correspond to one helical pitch. Based on the above fact, the pitch can be measured from the SEM cross-sectional view. A normal line perpendicular to each line of the stripe pattern is a helical axis direction.

(Cholesteric Structure in Dot)

In a case where the inclined portion or the curved portion in the dot is observed in a cross-sectional view using a scanning electron microscope (SEM), it is preferable that angles between normal lines perpendicular to lines, which are formed using first and second dark portions from a surface of the dot opposite to the substrate, and the surface are the same, it is more preferable that angles between normal lines perpendicular to lines, which are formed by first to third or fourth dark portion from a surface of the dot opposite to the substrate, and the surface are the same, it is still more preferable that angles between normal lines perpendicular to lines, which are formed using first to fifth to twelfth or more dark portions from a surface of the dot opposite to the substrate, and the surface are the same.

Specifically, an angle between a normal line perpendicular to a line, which is formed using a first dark portion from a surface of the dot opposite to the substrate, and the surface is in a range of 70° to 90°. At this time, regarding all the points of the inclined portion or the curved portion, an angle between a normal direction perpendicular to a line, which is formed using a first dark portion from a surface of the dot opposite to the substrate, and the surface may be in a range of 70° to 90°. That is, the angle only has to satisfy the above-described range at some points of the inclined portion or the curved portion. For example, the angle only has to satisfy the above-described range not intermittently but continuously at some points of the inclined portion or the curved portion. In a case where the surface in the cross-sectional view is curved, an angle between the normal line and the curved surface refers to an angle between the normal line and a tangent line from the surface. In addition, the angle between the normal line and the surface is expressed by an acute angle and is in a range of 70° to 110° when expressed by an angle of 0° to 180°. In the cross-sectional view, it is preferable that an angle between a normal line perpendicular to each of lines, which are formed using first and second dark portions from a surface of the dot opposite to the substrate, and the surface is in a range of 70° to 90°, it is more preferable that an angle between a normal line perpendicular to each of lines, which are formed using first to third or fourth dark portions from a surface of the dot opposite to the substrate, and the surface is in a range of 70° to 90°, and it is still more preferable that an angle between a normal line perpendicular to each of lines, which are formed using first to fifth to twelfth or more dark portions from a surface of the dot opposite to the substrate, and the surface is in a range of 70° to 90°.

The angle is preferably in a range of 80° to 90° and more preferably in a range of 85° to 90°.

The cross-sectional view obtained using the SEM shows that a helical axis of the cholesteric structure forms an angle of 70° to 90° with a surface of the dot of the inclined portion or the curved portion. Due to the above-described structure, light incident on the dot in a direction with an angle from a normal direction perpendicular to the substrate can be made to be incident at an angle, which is substantially parallel to the helical axis direction of the cholesteric structure, at the inclined portion or the curved portion. Therefore, light which is incident on the dot can be reflected in various directions. For example, it is preferable that light which is incident from a normal direction perpendicular to the substrate can be reflected in all the directions. In particular, it is preferable that an angle (half power angle) in which the brightness is half of the front brightness (peak brightness) can be made to be 35° or greater and that high reflecting properties are exhibited.

It is preferable that, by making a helical axis of the cholesteric structure to form an angle of 70° to 90° with a surface of the dot of the inclined portion or the curved portion, an angle between a normal direction perpendicular to a line, which is formed using a first dark portion from the surface, and a normal direction perpendicular to the substrate continuously decreases along with a continuous increase in the height.

The cross-sectional view is a cross-sectional view of a surface in an arbitrary direction including a portion having a height which continuously increases to a maximum height in a direction moving from an end portion of the dot to the center of the dot. Typically, the cross-sectional view may be a cross-sectional view of an arbitrary surface which includes the center of the dot and is perpendicular to the substrate.

(Method of Forming Cholesteric Structure)

The cholesteric structure can be obtained by immobilizing a cholesteric liquid crystal phase. The structure in which a cholesteric liquid crystal phase is immobilized may be a structure in which the orientation of the liquid crystal compound as a cholesteric liquid crystal phase is immobilized. Typically, the structure in which a cholesteric liquid crystal phase is immobilized may be a structure which is obtained by making the polymerizable liquid crystal compound to be in a state where a cholesteric liquid crystal phase is oriented, polymerizing and curing the polymerizable liquid crystal compound with ultraviolet irradiation, heating, or the like to foini a layer having no fluidity, and concurrently changing the state of the polymerizable liquid crystal compound into a state where the oriented state is not changed by an external field or an external force. The structure in which a cholesteric liquid crystal phase is immobilized is not particularly limited as long as the optical characteristics of the cholesteric liquid crystal phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

Examples of a material used for forming the cholesteric structure include a liquid crystal composition including a liquid crystal compound. It is preferable that the liquid crystal compound is a polymerizable liquid crystal compound.

The liquid crystal composition including a polymerizable liquid crystal compound further includes a surfactant. The liquid crystal composition may further include a chiral agent and a polymerization initiator.

—Polymerizable Liquid Crystal Compound—

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming a cholesteric liquid crystal layer include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the orientation temperature can be decreased.

Specific examples of the polymerizable liquid crystal compound include a compound represented by any one of the following formulae (1) to (11).

(1)

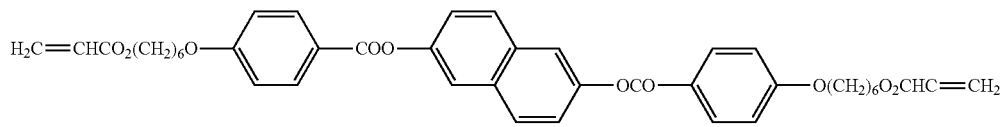

(2)

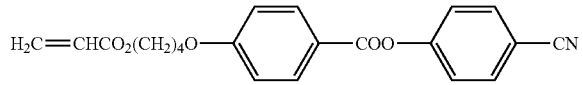

(3)

(4)

(5)

(6)

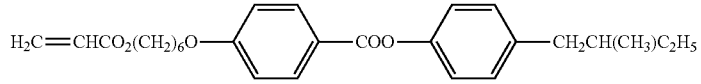

(7)

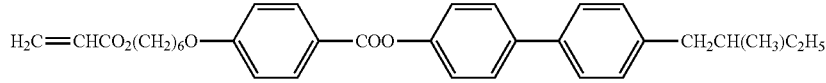

(8)

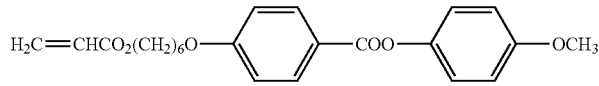

(9)

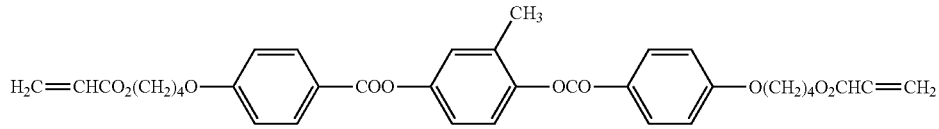

(10)

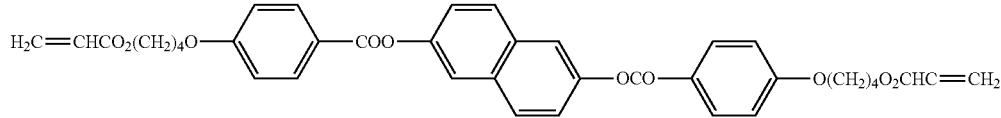

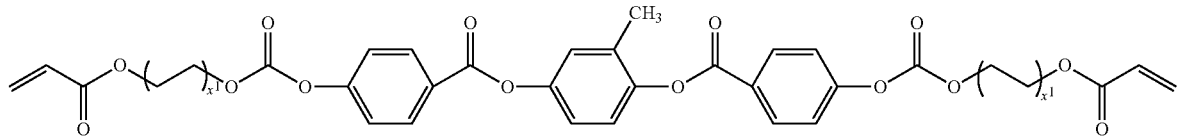

(11)

[In Compound (11), $X^1$ represents 2 to 5 (integer).]

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

In the present invention, it is preferable that a surfactant is added to the liquid crystal composition during the formation of the dot. As a result, the polymerizable liquid crystal compound is oriented to be parallel to an air interface side during the formation of the dot, and the helical axis direction can be controlled as described above. It is preferable that the surfactant is a compound which can function as an orientation controller contributing to the stable or rapid formation of a cholesteric structure with planar orientation. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As a horizontal orientation agent, one kind may be used alone, or two or more kinds may be used in combination.

Examples of the fluorine surfactant include a compound represented by the following Formula (I) described in paragraphs "0082" to "0090" of JP2014-119605A.

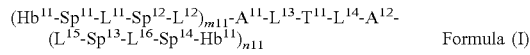

Formula (I)

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of the dot. From this viewpoint, —O—, —S—, —CO—, —COO—, —OCO—, —COS— or —SCO— is more preferable. From the viewpoint of the stability of the compound, —O—, —CO—, —COO—, or —OCO— is more preferable. An alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ or $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of T described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be oriented even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent aromatic heterocyclic group preferably represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms),

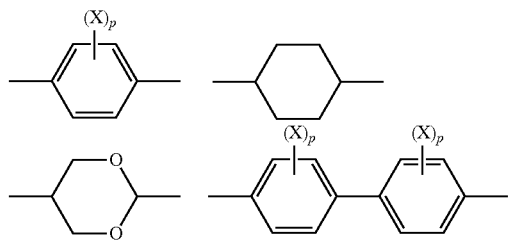

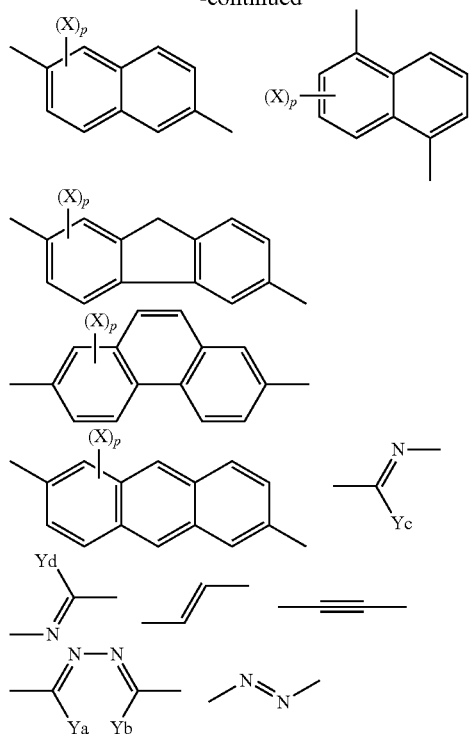

more preferably represented by any one of the following formulae,

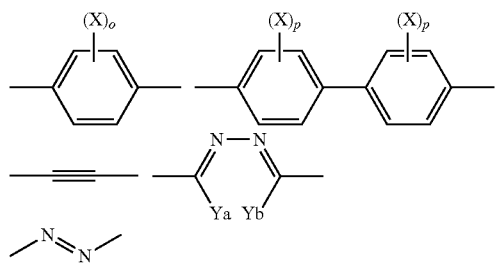

still more preferably represented by the following formula.

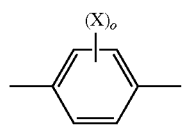

The number of carbon atoms in the alkyl group represented by X in $T^{11}$ is 1 to 8, preferably 1 to 5, and more preferably 1 to 3. The alkylene group may be linear, branched, or cyclic and is preferably linear or branched. Preferable examples of the alkyl group include a methyl group, an ethyl group, an n-propyl group, and an isopropyl group. Among these, a methyl group is preferable. The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by R'COO—. R' represents, for example, an alkyl group having 1 to 8 carbon atoms. The description and preferable range of the alkyl group represented by R' can be found in the description and preferable range of the alkyl group represented by X in $T^{11}$. Specific examples of the ester include $CH_3COO$— and $C_2H_5COO$—. The alkyl group having 1 to 4 carbon atoms represented by Ya, Yb, Yc, or Yd may be linear or branched. Examples of the alkyl group having 1 to 4 carbon atoms include a methyl group, an ethyl group, an n-propyl group, and an isopropyl group.

It is preferable that the divalent aromatic heterocyclic group has a 5-membered, 6-membered, or 7-membered heterocycle. A 5-membered or 6-membered heterocycle is more preferable, and a 6-membered heterocycle is most preferable. As a heteroatom constituting the heterocycle, a nitrogen atom, an oxygen atom, or a sulfur atom is preferable. It is preferable that the heterocycle is an aromatic heterocycle. In general, the aromatic heterocycle is an unsaturated heterocycle. An unsaturated heterocycle having most double bonds is more preferable. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^1$ or $A^2$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. At this time, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, and rotational symmetry.

The compound represented by Formula (I) is a combination of the perfluoroalkyl group ($Hb^{11}$), the linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$)$_{n11}$-, and preferably the divalent group having an excluded volume effect which is represented by T.

Two perfluoroalkyl groups ($Hb^{11}$) present in the molecule are preferably the same as each other, and the linking groups $-(-Sp^{11}-L^{11}-Sp^{12}-L^{12})m_{11}-A^{11}-L^{13}-$ and $-L^{14}-A^{12}-(L^{15}-Sp^{13}-L^{16}-Sp^{14})n_{11}-$ present in the molecule are also preferably the same as each other. $Hb^{11}-Sp^{11}-L^{11}-Sp^{12}-$ and $-Sp^{13}-L^{16}-Sp^{14}-Hb^{11}$ present at the terminal are preferably a group represented by any one of the following formulae:

$(C_aF_{2a+1})-(C_bH_{2b})-$;

$(C_aF_{2a+1})-(C_bH_{2b})-O-(C_rH_{2r})-$;

$(C_aF_{2a+1})-(C_bH_{2b})-COO-(C_rH_{2r})-$; and $(C_aF_{2a+1})-(C_bH_{2b})-OCO-(C_rH_{2r})-$.

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}-Sp^{11}-L^{11}-Sp^{12}-L^{12}$ and $-L^{15}-Sp^{13}-L^{16}-Sp^{14}-Hb^{11}$ present at the terminal of Formula (I) are preferably a group represented by any one of the following formulae:

$(C_aF_{2a+1})-(C_bH_{2b})-O-$;

$(C_aF_{2a+1})-(C_bH_{2b})-COO-$;

$(C_aF_{2a+1})-(C_bH_{2b})-O-(C_rH_{2r})-O-$;

$(C_aF_{2a+1})-(C_bH_{2b})-COO-(C_rH_{2r})-COO-$; and $(C_aF_{2a+1})-(C_bH_{2b})-OCO-(C_rH_{2r})-COO-$.

In the above formulae, a, b, and r have the same definitions as described above.

The addition amount of the surfactant in the liquid crystal composition is preferably 0.01 mass % to 10 mass %, more preferably 0.01 mass % to 5 mass %, and still more preferably 0.02 mass % to 1 mass % with respect to the total mass of the polymerizable liquid crystal compound.

—Chiral Agent (Optically Active Compound)—

The chiral agent has a function of causing a helical structure of a cholesteric liquid crystal phase to be formed. The chiral compound may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for TN or STN, p. 199), isosorbide, or an isomannide derivative can be used.

In general, the chiral agent includes an asymmetric carbon atom. However, an axially asymmetric compound or a surface asymmetric compound not having an asymmetric carbon atom can be used. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this configuration, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by photomask exposure of an actinic ray or the like after coating and orientation, which is preferable. As the photoisomerization group, an isomerization portion of a photochromic compound, azo, azoxy, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by the following Formula (12).

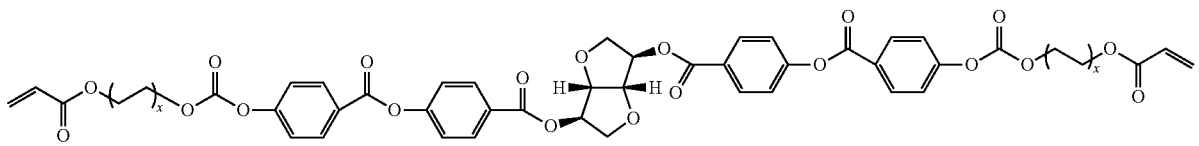

(12)

In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

—Polymerization Initiator—

In a case where the liquid crystal composition includes a polymerizable compound, it is preferable that the liquid crystal composition includes a polymerization initiator. In a configuration where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367, 661A and 2,367,670A), an acyloin ether (described in U.S. Pat. No. 2,448,828A), an α-hydrocarbon-substituted aromatic acyloin compound (described in U.S. Pat. No. 2,722, 512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 mass % to 12 mass % with respect to the content of the polymerizable liquid crystal compound.

—Crosslinking Agent—

In order to improve the film hardness after curing and to improve durability, the liquid crystal composition may arbitrarily include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these curing agents, one kind may be used alone, or two or more kinds may be used in combination.

The content of the crosslinking agent is preferably 3 mass % to 20 mass % and more preferably 5 mass % to 15 mass %. In a case where the content of the crosslinking agent is lower than 3 mass %, an effect of improving the crosslinking density may not be obtained. In a case where the content of the crosslinking agent is higher than 20 mass %, the stability of a cholesteric liquid crystal layer may deteriorate.

—Other Additives—

In a case where an ink jet method described below is used as a method of forming the dot, a monofunctional polymerizable monomer may be added to the liquid crystal composition in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, an ultraviolet absorber, a light stabilizer, a colorant, metal oxide particles or the like can be added to the liquid crystal composition in a range where optical performance and the like do not deteriorate.

It is preferable that the liquid crystal composition is used as a liquid during the formation of the dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. Among these curing agents, one kind may be used alone, or two or more kinds may be used in combination. Among these, a ketone can be preferably used in consideration of an environmental burden.

The liquid crystal composition is applied to the substrate and then is cured to form the dot. A method of providing a plurality of dots on the substrate is not particularly limited and, for example, an ink jet method, a gravure printing method, or a flexographic printing method can be used. Among these, an ink jet method is preferably used. The pattern of the dots can also be formed using a well-known printing technique.

For example, the liquid crystal composition jetted to the substrate is optionally dried or heated and then cured. In a drying or heating step, the polymerizable liquid crystal compound in the liquid crystal composition only has to be cholesterically oriented. In the case of heating, the heating temperature is preferably 200° C. or lower and more preferably 130° C. or lower.

The liquid crystal compound, which is dried or cured and cholesterically oriented, is cured. Curing is performed by heating or light irradiation and is preferably performed by light irradiation. Regarding the light irradiation, ultraviolet light is preferably used. The irradiation energy is preferably 20 mJ/cm$^2$ to 50 J/cm$^2$ and more preferably 100 mJ/cm$^2$ to 1500 mJ/cm$^2$. In order to promote a photocuring reaction, light irradiation may be performed under heating conditions or in a nitrogen atmosphere. The wavelength of irradiated ultraviolet light is preferably 250 nm to 430 nm. From the viewpoint of stability, the polymerization degree is preferably high, and is preferably 70% or higher and more preferably 80% or higher.

The polymerization degree can be determined by obtaining a consumption ratio between polymerizable functional groups using an IR absorption spectrum.

In this specification, "haze" refers to a value measured using a haze meter NDH-2000 (manufactured by Nippon Denshoku Industries Co., Ltd.).

Theoretically, haze refers to a value expressed by the following expression.

(Diffuse Transmittance of Natural Light at 380 to 780 nm)/(Diffuse Transmittance of Natural Light at 380 to 780 nm+Direct Transmittance of Natural Light)×100%

The diffuse transmittance refers to a value calculated by subtracting the direct transmittance from a total transmittance which is obtained using a spectrophotometer and an integrating sphere unit. The direct transmittance refers to a transmittance at 0° in a case where a value measured using an integrating sphere unit is used.

In addition, "image clarity" refers to a value calculated based on JIS K 7374 and can be measured using an image clarity meter ICM-1 (manufactured by Suga Test Instruments Co., Ltd.)

In addition, "transmittance" can be measured using the above-described haze meter or a spectrophotometer UV3150 (manufactured by Shimadzu Corporation).

In addition, in the optical member according to the present invention, the upper limit of the haze is preferably 30% or lower, more preferably 25% or lower, and still more preferably 20% or lower.

The image clarity of the optical member according to the present invention at an optical comb width of 0.125 mm is preferably 70% or higher, more preferably 75% or higher, and still more preferably 80% or higher.

[Overcoat Layer]

It is preferable that the optical member includes an overcoat layer. The overcoat layer may be provided on the surface of the substrate where the dot is formed, and it is preferable that the surface of the optical member is smoothened. Haze caused by surface unevenness which is derived from the dot shape can be reduced. As a result, the above-described properties obtained from the cholesteric structure can be maintained while maintaining high image clarity. Therefore, the optical member having high transparency and scattering properties can be manufactured.

The overcoat layer is preferably a resin layer having a refractive index of about 1.4 to 1.8. The refractive index of the dot formed of the liquid crystal material is about 1.6. By using an overcoat layer having a refractive index close to 1.6, the angle (polar angle) from the normal line of light which is actually incident on the dot can be reduced. For example, in a case where the overcoat layer having a refractive index of 1.6 is used and light is incident on the optical member at a polar angle of 45°, a polar angle at which light is reliably incident on the dot can be made to be about 27°. Therefore, by using the overcoat layer, the polar angle of light at which the optical member exhibits retroreflection properties can be widened, and high retroreflection properties can be obtained at a wider angle even in the dot in which an angle between a surface, which is opposite to the substrate, and the substrate is small. In addition, the overcoat layer may function as an anti-reflection layer, a pressure sensitive adhesive layer, an adhesive layer, or a hard coat layer.

Examples of the overcoat layer include a resin layer which is obtained by applying a composition including a monomer to the surface of the substrate where the dot is formed, and curing the coating film. The resin may be selected in consideration of, for example, adhesiveness with the substrate or the liquid crystal material for forming the dot. For example, a thermoplastic resin, a thermosetting resin, or an ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer include ethyl (meth)acrylate, ethylhexyl (meth)acrylate, styrene, methylstyrene, N-vinylpyrrolidone, polymethylol propane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer may be selected depending on the maximum height of the dot, and is preferably about 5 μm to 100 μm, more preferably 10 μm to 50 μm, and still more preferably 20 μm to 40 μm. The thickness of the overcoat layer is the distance from the surface of the substrate where the dot is not formed to the surface of the overcoat layer.

In a case where the overcoat layer is provided, it is preferable that a difference in refractive index between the overcoat layer and the dot is as low as possible. Specifically, the difference in refractive index is preferably 0.20 or lower, more preferably 0.10 or lower, and still more preferably 0.04 or lower.

Examples of the other layer include an underlayer that is provided between the substrate and the dot. The underlayer is provided, for example, in order to adjust the surface shape during the formation of the dot, to secure adhesiveness between the dot and the substrate, and to adjust the orientation of the polymerizable liquid crystal compound during the formation of the dot. It is preferable that the underlayer is a resin layer. It is preferable that the underlayer is a thermosetting resin or a photocurable resin obtained by curing a composition including a polymerizable compound which is directly applied to a surface of the substrate. Examples of the polymerizable compound include a non-liquid crystal compound such as a (meth)acrylate monomer or a urethane monomer. It is preferable that the reflectance of the underlayer is low at a wavelength where the dot reflects light, and it is preferable that the underlayer does not include a material which reflects light at a wavelength where the dot reflects light. In addition, it is preferable that the underlayer is transparent. Further, the refractive index of the underlayer is preferably about 1.2 to 2.0 and more preferably about 1.4 to 1.8. The thickness of the underlayer is not particularly limited and is preferably 0.01 to 50 μm and more preferably 0.05 to 20 μm.

<Application of Optical Member>

The application of the optical member according to the present invention is not particularly limited and can be used as various scattering members or reflection members.

A combination of the optical member according to the present invention and a light source can be used as an optical element in which the substrate functions as a light guide plate. In this case, the dot is in direct contact with the substrate. In the optical element prepared as described above, circularly polarized light scattered by the dot is emitted by the light source emitting light from the light guide plate side (used as a so-called side edge type light guide plate). On the other hand, circularly polarized light, which passes through the dot and has a different optical rotation from that of the above-described circularly polarized light, is changed in optical rotation by total reflection from the light guide plate or the substrate and is in substantially the same polarization state as that of the emitted circularly polarized light. This phenomenon repeatedly occurs in the light guide plate. as a result, the circularly polarized state of the emitted light has a high polarization degree.

In the optical element according to the present invention, a light guide member can also be provided separately of the substrate. In this case, the same material as that of the substrate can be used as a material of the light guide member. It is preferable that the light guide member is in direct contact with the dot or the overcoat layer in contact with the dot and that the dot is interposed or the dot and the overcoat layer are interposed between the substrate and the light guide member.

In addition, the directivity of emitted light is controlled by adjusting the dot shape. For example, by selectively reflecting blue light/green light/and red light, a backlight having high color reproducibility and a high light use efficiency can be provided. At this time, it is necessary that an λ/4 plate is disposed between the optical element and the polarizing plate.

In addition, by changing circularly polarized light in an oblique direction into linearly polarized light, the amount of light absorbed by a backlight-side polarizing plate is reduced. Therefore, Rth of the λ/4 plate is preferably −80 to 80 nm and more preferably −50 to 50 nm.

The dots may be provided on either or both of one surface (visible side) and the other surface (side opposite to the visible side) of the substrate.

In addition, a pattern of the dots is not particularly limited. In a case where the dots are used in an optical element, it is preferable that a density distribution is present from the viewpoint of in-plane uniformity. For example, it is preferable that the density of dots continuously changes from low to high in a direction from the light source side to the opposite side as shown in FIG. 7. Here, in FIG. 7, L1>L2, and W1>W2.

As the light source, for example, a fluorescent light, an LED, or a laser light source is considered. The reflection wavelength of the dot can be adjusted depending on the kind of the light source. In particular, from the viewpoint of realizing wide color reproducibility, a three-wavelength LED or a laser light source having a narrow full width at half maximum may be used. Separately of the above-described light source, emission using quantum dots or quantum rods can also be used. In this case, it is preferable that the light source has a spectrum of blue light to near-ultraviolet light.

In the present invention, the optical element which includes at least the cholesteric liquid crystals having a dot shape, the light guide plate, and the light source is used instead of a side-edge type backlight of the related art. Therefore, the light use efficiency is high. Optionally, a reflection plate or a diffusion plate can be disposed on the side opposite to the visible side. The reflection plate is not particularly limited and is preferably a metal (for example, silver or aluminum) deposited sheet. In addition, optionally, an λ/4 plate may be provided between the light guide plate and the reflection plate.

[Liquid Crystal Display Device]

In addition, a combination of the above-described optical element, a liquid crystal cell, and a polarizing plate can be used as a liquid crystal display device (LCD).

[Polarizing Plate]

The polarizing plate according to the present invention is not particularly limited, and a polarizing plate including a polarizing film and a protective film can be used. The protective film is provided on at least an outer surface of the polarizing film (when it is disposed in a liquid crystal display device, a surface of the polarizing film opposite to a surface facing a liquid crystal cell), and it is preferable that the protective film is provided on both surfaces of the polarizing film.

As the polarizing film of the polarizing plate, a well-known polarizing film plate can be used without any particular limitation. For example, an iodine polarizing film, a dye polarizing film using a dichroic dye, a polyene polarizing film can be used. In general, the iodine polarizing film or the dye polarizing film is manufactured using a polyvinyl alcohol film. As the thickness of the polarizing film, the thickness which is adopted in a typical polarizing plate can be adopted without any particular limitation.

As the protective film of the polarizing plate, a well-known protective film can be used without any particular limitation. For example, a polymer described in paragraphs "0016" to "0018" of JP4825934B can be used.

[Liquid Crystal Cell]

The liquid crystal cell used in the present invention is not particularly limited, and various well-known mode liquid crystal cells can be used. Examples of the liquid crystal cell include an IPS mode, an FFS mode, a VA mode, a TN mode, an OCB mode, and an ECB mode.

In addition, the optical element, which includes at least the cholesteric liquid crystals having a dot shape, the light guide plate, and the light source, has extremely high transparency. Therefore, by combining the optical element with an LCD, a transparent display can be easily provided. The optical element can be disposed on either a visible side of the LCD or a side (typically a backlight side) of the LCD opposite to the visible side and is preferably disposed on the side of the LCD opposite to the visible side from the viewpoint of using circularly polarized light and obtaining higher brightness. In this case, as described above, it is necessary that an λ/4 plate is disposed between the optical element and the polarizing plate.

In addition, by using the optical element according to the present invention, a wearable display having both wide color reproducibility and transparency can be provided. As described above, in a case where an image is incident on eyes by total reflection, the above-described wearable display can be achieved by disposing the above-described optical element.

In this case, in order to change the directivity to a specific direction, it is preferable that the dot shape is an asymmetrical conical shape as shown in FIG. 3. In addition, the dots may partially overlap each other.

In addition, wide color reproducibility can be achieved by selectively reflecting blue light, green light, and red light depending on the light source, and transparency can also be realized by providing the overcoat layer.

In addition, by using the optical member according to the present invention, a transparent screen which projects a stereo image can be provided. For example, an optical member is prepared in which dot-shaped cholesteric liquid crystals which reflect right circularly polarized light are disposed on one surface of the substrate and in which dot-shaped cholesteric liquid crystals which reflect left circularly polarized light are disposed on one surface of the substrate.

On the other hand, a rotating plate including both a projector and an λ/4 plate is prepared, the λ/4 plate being provided before the projector and having an axis shifted from that of the projector by 90 degrees. By rotating the rotating plate in synchronization with switching and displaying a right eye image and a left eye image, the respective images are projected such that the same circularly polarized state is obtained while displaying the images (for example, when the right eye image is displayed, right circularly polarized light is emitted). By projecting the images on the optical member and observing the projected images with circularly polarized 3D glasses, a transparent screen on which a stereo image is displayed can be provided. Since the transparency is high, a stereo image can be seen as if floating in the air, and the augmented reality is high.

In addition, by using the optical member in which the cholesteric liquid crystals having a dot shape are used, a transparent screen having a wide view angle (for example, right and left) in a specific direction can be provided.

A method of providing such a transparent screen is not particularly limited. For example, it is assumed that an optical member has a dot shape in which a plurality of lines are disposed on the substrate, each of the lines having a pattern where the dots are continuously disposed in a vertical direction without no gaps. By projecting images on this optical member using a projector, a transparent screen on which the images can be easily observed not only from the front but also from right and left directions can be provided, and the augmented reality can be made to be high.

[Near-to-Eye Optical Element]

A near-to-eye optical element according to the present invention is not particularly limited as long as it is known as a head mounted display. Although not limited thereto, the near-to-eye optical element may be an element which has advantageous effects in that it can display an image or video information in combination with an image display portion disposed near eyes and, by superimposing the image or the video information over the environment, can improve augmented reality and can perform an operation without shifting the line of sight. Representative examples of the near-to-eye optical element include Google Glass (Google Inc.), MOVERIO (Seiko Epson Corporation), and M2000AR (Vizux Corporation).

In the near-to-eye optical element, the visual field may be transparent or opaque and is preferably transparent because a sense of unity can be increased.

EXAMPLES

Hereinafter, the present invention will be described in detail using examples. Materials, reagents, amounts thereof, proportions thereof, operations, and the like shown in the following examples can be appropriately changed as long as they do not depart from the scope of the present invention. Accordingly, the scope of the present invention is not limited to the following examples.

Example 1

<Preparation of Protective Film 01>

A cellulose acetate film was prepared with reference to Examples (paragraphs "0267" to "0270") described in JP2012-18396A. The thickness was 60 μm and Re (550) and Rth (550) were 0.8 nm and 60 nm, respectively. This cellulose acetate film was set as a protective film 01.

<Preparation of λ/4 Plate>

An λ/4 plate was prepared by forming an alignment film and an optically-anisotoropic layer on the protective film 01 as a support with reference to Examples (paragraphs "0272" to "0282") described in JP2012-18396A. Re (550) and Rth (550) were 130 nm and −5 nm, respectively.

<Preparation of Polarizing Film>

A polarizing film was prepared using a polyvinyl alcohol film and iodine with reference to Examples (paragraph "0291") described in JP2012-18396A.

<Preparation of Polarizer Layer with λ/4 Plate>

By using a 3 mass % polyvinyl alcohol (PVA-117H, manufactured by Kuraray Co., Ltd.) aqueous solution as an adhesive, the protective film 01 having undergone alkali saponification is adhered to one surface of the polarizing film and the λ/4 plate was adhered to the other surface of the polarizing film such that the support side was the polarizing film side. As a result, a polarizer layer with the λ/4 plate was prepared.

(Preparation of Underlayer)

A composition shown below was stirred and dissolved in a container held at 25° C. to prepare an underlayer-forming solution.

Underlayer-Forming Solution (part(s) by mass)
Propylene glycol monomethyl ether acetate: 67.8
Dipentaerythritol hexaacrylate (trade name: KAYARAD DPHA, manufactured by Nippon Kayaku Co., Ltd.): 5.0
MEGAFACE RS-90 (manufactured by DIC Corporation): 26.7
IRGACURE 819 (manufactured by BASF SE): 0.5

The underlayer-forming solution prepared as described above was applied to the protective film 01 prepared as described above using a bar coater in an application amount of 3 mL/m$^2$. Next, the underlayer-forming solution was heated such that the film surface temperature was 90° C., and then was dried for 120 seconds. Next, in a nitrogen purged atmosphere having an oxygen concentration of 100 ppm or lower, 700 mJ/cm$^2$ of ultraviolet light was irradiated using an ultraviolet irradiation device to promote a crosslinking reaction. As a result, an underlayer was prepared.

(Formation of Cholesteric Liquid Crystal Dot)

A composition shown below was stirred and dissolved in a container held at 25° C. to prepare a cholesteric liquid crystal ink solution (liquid crystal composition) 1.

Cholesteric Liquid Crystal Ink Solution 1 (part(s) by mass)
Methoxyethyl acrylate: 145.0
A mixture of rod-shaped liquid crystal compounds having the following structures: 100.0
IRGACURE 819 (manufactured by BASF SE): 10.0
A chiral agent having the following structure: 5.8
A surfactant having the following structure: 0.08

Rod-Shaped Liquid Crystal Compound

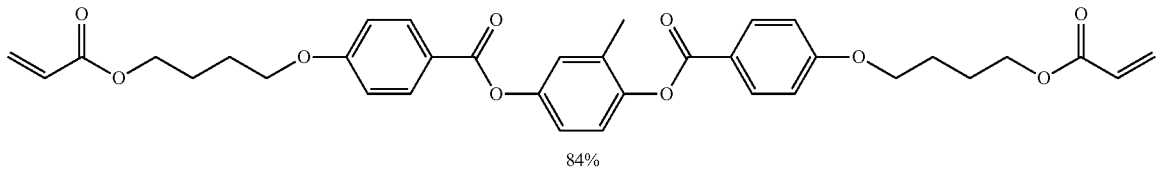

84%

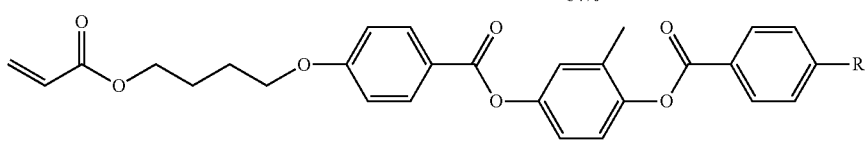

14%

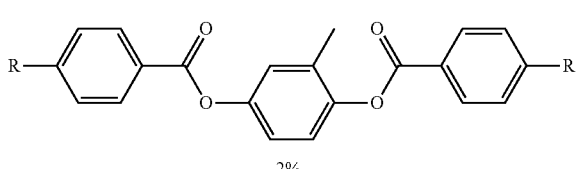

2%

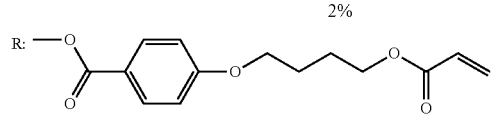

Numerical values are represented by mass %. In addition, a group represented by R is a partial structure present on the left and right sides, and this partial structure is bonded to an oxygen atom portion.

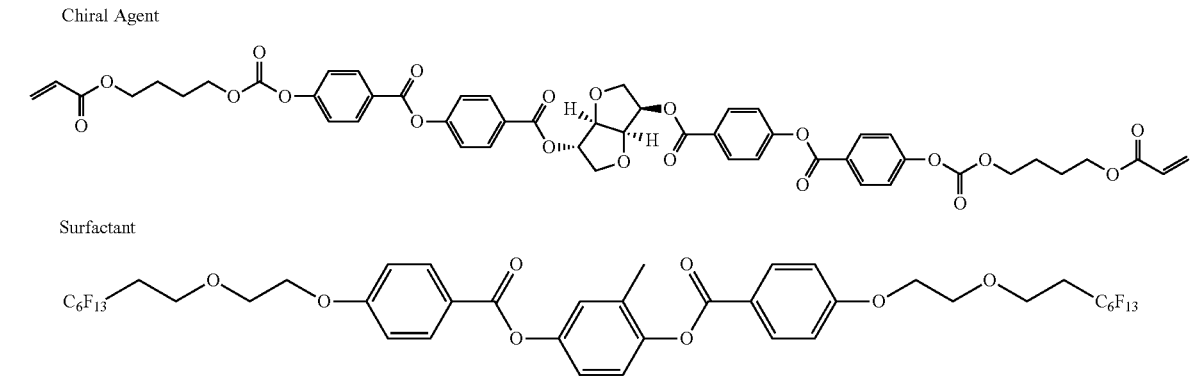

The cholesteric liquid crystal ink solution 1 prepared as described above was jetted to the underlayer of the protective film 01 prepared as described above using an ink jet printer (DMP-2831, manufactured by Fujifilm Dimatix Inc.) while adjusting the liquid amount such that dot diameter was 20 μm. Next, the cholesteric liquid crystal ink solution 1 was dried at 95° C. for 30 seconds and was irradiated with 500 mJ/cm$^2$ of ultraviolet light using an ultraviolet irradiation device. As a result, a dot 01 was formed.

(Formation of Cholesteric Liquid Crystal Dot)

A cholesteric liquid crystal ink solution 2 (liquid crystal composition) was prepared using the same method as that of the cholesteric liquid crystal ink solution (liquid crystal composition) 1, except that the addition amount of the chiral agent was 5.1 parts by mass. Using an ink jet printer, the cholesteric liquid crystal ink solution 2 was jetted to the underlayer to form a dot 02 thereon. At this time, the distance between the center of the dot 02 and the center of the dot 01 formed by jetting the ink solution 1 was adjusted to be 25 μm.

(Formation of Cholesteric Liquid Crystal Dot)

A cholesteric liquid crystal ink solution 3 (liquid crystal composition) was prepared using the same method as that of the cholesteric liquid crystal ink solution (liquid crystal composition) 1, except that the addition amount of the chiral agent was 6.5 parts by mass. Using an ink jet printer, the cholesteric liquid crystal ink solution 3 was jetted to the underlayer to form a dot 03 thereon. At this time, the distance between the center of the dot 03 and the center of the dot 01 or 02 formed by jetting the ink solution 1 or 2 was adjusted to be 25 μm. A positional relationship between the dots 01, 02, and 03 is shown in FIG. 7. The distance between the centers of the dots corresponds to R1 in FIG. 7.

As shown in FIG. 7, the dots 01, 02, and 03 were set as one dot group, and the ink solutions were jetted such that 35 dot groups (the number of dots was 105) on average were formed per 1 mm$^2$ in one end portion, 180 dot groups (the number of dots was 540) on average were formed per 1 mm$^2$ in the other end portion, and the density of dots continuously increases by one dot group in a region between the end portions. As a result, an optical member 01 having a size of 150×200 mm was obtained.

(Dot Shape and Evaluation of Cholesteric Structure)

Among the dots of the optical member 01 obtained as described above, 10 dots were selected arbitrarily, and the shapes of the dots were observed using a laser microscope (manufactured by Keyence Corporation). The average diameter of the dots was 23 μm, the average maximum height was 10 μm, an average angle (contact angle) at a contact portion between a dot surface of a dot end portion and a underlayer surface was 83 degrees, and the height was continuously increased in a direction from the dot end portion to the center.

Figure 9:
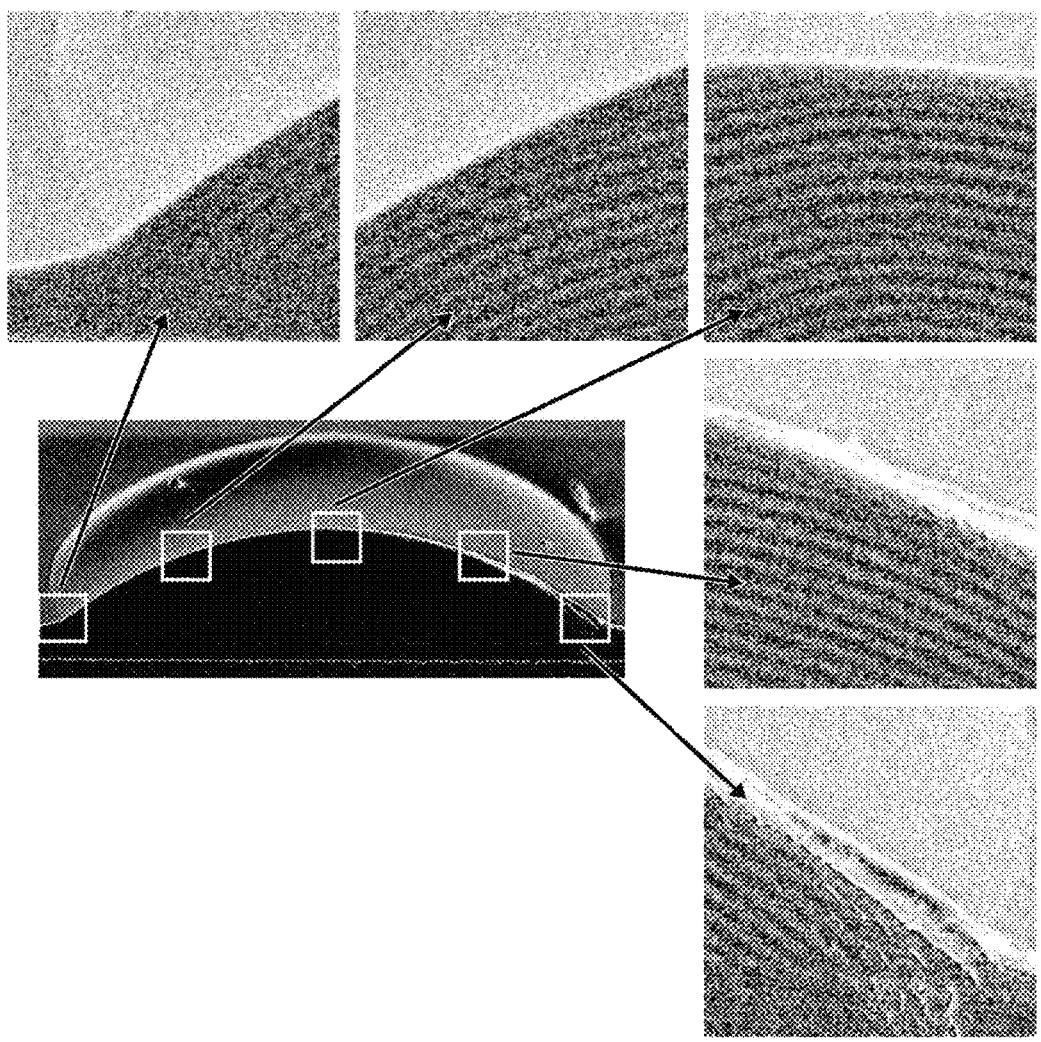
FIG. 9 is a diagram showing images of a cross-section of a dot of a transparent screen prepared in Example when observed with a scanning electron microscope (SEM).

Regarding one dot positioned at the center of the optical member 01 obtained as described above, a surface including the dot center was cut in a direction perpendicular to the PET substrate, and the obtained cross-section was observed using the above-described scanning electron microscope. As a result, a stripe pattern including bright portions and dark portions was observed in the dot, and a cross-sectional view shown in FIG. 9 was obtained.

In the cross-sectional view, an angle between a normal direction perpendicular to a line, which was formed using a first dark line from an air interface-side surface of the dot, and the air interface-side surface was measured. The angles measured at a dot end portion, at a portion between the dot end portion and the dot center, at the dot center were 90 degrees, 89 degrees, and 90 degrees, respectively. Further, regarding an angle between the normal direction of the line formed using the dark line and a normal direction perpendicular to the PET substrate, the values measured at a dot end portion, at a portion between the dot end portion and the dot center, at the dot center were 84 degrees, 38 degrees, and 0 degrees, respectively, which were continuously decreased.

(Formation of Overcoat Layer)

A composition shown below was stirred and dissolved in a container held at 25° C. to prepare an overcoat layer-forming coating solution.

Overcoat Layer-Forming Coating Solution (part(s) by mass)
Acetone: 100.0
KAYARAD DPCA-30 (manufactured by Nippon Kayaku Co., Ltd.): 100.0
IRGACURE 819 (manufactured by BASF SE): 3.0

The overcoat layer-forming coating solution prepared as described above was applied to the optical member 01 using a bar coater. Next, the overcoat layer-forming coating solution was heated such that the film surface temperature was 50° C., and then was dried for 60 seconds. Next, 500 mJ/cm$^2$ of ultraviolet light was irradiated using an ultraviolet irradiation device to promote a crosslinking reaction. As a result, the optical member 01 in which an overcoat layer having a thickness of 10 μm from an upper end of the underlayer was prepared. The thickness of the overcoat layer was measured based on a cross-sectional SEM image.

(Sample: Measurement)

iPad Air (manufactured by Apple Inc.) was disassembled to extract a light source, a light guide plate, and a reflection plate therefrom, and a surface of the optical member 01 where the dots were not formed was adhered to a rear side of the light guide plate of iPad Air using a pressure sensitive adhesive (manufactured by Soken Chemical&Engineering Co., Ltd.). At this time, an end portion side having a low density was the light source side.

(Measurement of Front Brightness)

Next, a polarizing plate with an λ/4 plate of a light source was disposed such that the λ/4 plate was on the light source side, and the brightness thereof from a normal direction perpendicular to a panel was measured. For the measurement, a colorimeter BM-5 (manufactured by Tocon Technohouse Corporation) was used.

(Measurement of Total Luminous Flux)

The total luminous flux of the polarizing plate having the above-described configuration was measured using EZ Contrast (manufactured by ELDIM) in consideration of brightness values measured at a polar azimuthal angle interval of 15 degrees and a solid angle.

Comparative Example 1 and Measurement Results

A sample in which the optical member 01 was not adhered was set as Comparative Example 1, and Table 1 shows respective values when the brightness and the total luminous flux of Comparative Example 1 were normalized as 100.

TABLE 1

|  | EXAMPLE 1 | COMPARATIVE EXAMPLE 1 |
| --- | --- | --- |
| Front Brightness | 130 | 100 |
| Total Luminous Flux | 150 | 100 |

Example 2, Comparative Example 2

The member and the configuration of Example 2 were the same as those of Example 1, except that the reflection plate was removed. As in the case of Comparative Example 1, a sample in which the optical member 01 was not adhered was set as Comparative Example 2. The results are shown in Table 2.

TABLE 2

|  | EXAMPLE 2 | COMPARATIVE EXAMPLE 2 |
| --- | --- | --- |
| Front Brightness | 130 | 100 |
| Total Luminous Flux | 150 | 100 |
| Transmittance | 130 | 100 |
| Haze | 0.8 | 30 |
| Image Clarity | 88 | 65 |

Example 3

The amount of the cholesteric liquid crystal ink solution 1 used in Example 1 and the jetting positions thereof were adjusted, and dots having different heights were laminated as shown in FIG. 3 such that an envelope thereof has a triangular shape. Using the same method, the amounts of the cholesteric liquid crystal ink solutions 2 and 3 and the jetting positions thereof were adjusted, and the dots were laminated as shown in FIG. 3. As a result, an optical member 02 was prepared.

A white light source emits light to be incident on the optical member 02 at 45 degrees to measure the brightness of specularly reflected light. For the measurement, a colorimeter BM-5 (manufactured by Tocon Technohouse Corporation) was used.

Comparative Example 3

In Comparative Example 3, the same measurement as that of Example 3 was performed, except that a half mirror was used instead of the optical member 02. Measured values of Example 3 and Comparative Example 3 are shown in Table 3. Y represents a tristimulus value. In the table, u' and v' represent values in the u'v' chromaticity diagram.

As the half mirror, a product (Model No.: MJM-40, manufactured by Kodama Glass) was used.

TABLE 3

|  |  | EXAMPLE 3 | COMPARATIVE EXAMPLE 3 |
| --- | --- | --- | --- |
| Evaluation Item | Y, (u', v') | 130, (0.2, 0.43) | 100, (0.2, 0.43) |
|  | Transmittance | 130 | 100 |
|  | Haze [%] | 0.8 | 0.3 |
|  | Image Clarity [%] | 88 | 88 |

Example 4, Comparative Example 4

In Example 4 and Comparative Example 4, the same measurement as that of Example 3 and Comparative Example 3 was performed, except that laser light sources of red (wavelength: 650 nm), green (wavelength: 530 nm), and blue (wavelength: 450 nm) were used instead of the white light source. The results are shown in Table 4. In the table, X, Y, and Z represent tristimulus values, respectively. In the table, u' and v' represent values in the u'v' chromaticity diagram.

The laser light sources are available from, for example, Rezapointa.

TABLE 4

|  | EXAMPLE 4 | COMPARATIVE EXAMPLE 4 |
| --- | --- | --- |
| B Light Incidence: Z, (u', v') | 130, (0.22, 0.06) | 100, (0.22, 0.06) |
| G Light Incidence: Y, (u', v') | 130, (016, 0.81) | 100, (016, 0.81) |
| R Light Incidence: X, (u', v') | 130, (0.60, 0.51) | 100, (0.60, 0.51) |

The effectiveness of the present application was verified from the above-described results.

INDUSTRIAL APPLICABILITY

The present invention is applicable to an optical member, an optical element, a liquid crystal display device, a near-to-eye optical element, and the like.

EXPLANATION OF REFERENCES

1: cholesteric liquid crystal dot
2: overcoat layer

3: light guide member
3a: substrate
7: half mirror
9: optical member
10: light source

What is claimed is:

1. An optical member comprising:
a plurality of cholesteric liquid crystal dots that are provided on a substrate,
wherein a shape of each of the dots is a hemispherical or elliptical hemispherical shape in which the substrate side is planar, a conical or elliptical conical shape in which the substrate side is set as the bottom, a shape in which the top of one of the shapes is cut and flattened to be parallel to the substrate, or a shape in which a plurality of shapes selected from the shapes are laminated,
the dot has a reflection center wavelength with respect to visible light,
an average value of an angle between a surface of the dot opposite to the substrate and the substrate is 20° to 60°,
the cholesteric structure of the dot has a stripe pattern including bright portions and dark portions in a cross-sectional view of the dot when observed with a scanning electron microscope,
the dot includes a portion having a height which continuously increases to a maximum height in a direction moving from an end portion of the dot to the center of the dot, and
in all points of the portion, an angle between a normal line perpendicular to a line, which is formed using a first dark portion from a surface of the dot opposite to the substrate, and the surface of the dot is in a range of 70° to 90°, and an angle between a normal line perpendicular to a line, which is formed using a third or fourth dark portion from the surface of the dot opposite to the substrate, and the surface of the dot is in a range of 70° to 90°.

2. The optical member according to claim 1,
wherein the plurality of dots include at least one selective reflection center wavelength range selected from a range of 420 to 480 nm, a range of 520 to 580 nm, a range of 600 to 660 nm, and a range of 700 to 760 nm.

3. The optical member according to claim 2,
wherein an overcoat layer in contact with the plurality of dots is provided.

4. An optical element comprising:
the optical member according to claim 3; and
a light source,
wherein a substrate is a light guide member.

5. A liquid crystal display device comprising:
the optical element according to claim 4;
a liquid crystal cell; and
a polarizing plate.

6. An optical element comprising:
the optical member according to claim 3; and
a light source,
wherein a light guide member in direct contact with the optical member is provided in addition to a substrate.

7. A liquid crystal display device comprising:
the optical element according to claim 6;
a liquid crystal cell; and
a polarizing plate.

8. A near-to-eye optical member comprising at least:
the optical member according to claim 3; and
an image display portion.

9. An optical element comprising:
the optical member according to claim 1; and
a light source,
wherein a substrate is a light guide member.

10. A liquid crystal display device comprising:
the optical element according to claim 9;
a liquid crystal cell; and
a polarizing plate.

11. An optical element comprising:
the optical member according to claim 1; and
a light source,
wherein a light guide member in direct contact with the optical member is provided in addition to a substrate.

12. A liquid crystal display device comprising:
the optical element according to claim 11;
a liquid crystal cell; and
a polarizing plate.

13. A near-to-eye optical member comprising at least:
the optical member according to claim 1; and
an image display portion.

* * * * *